United States Patent [19]

Higashijima et al.

[11] Patent Number: 5,526,215
[45] Date of Patent: Jun. 11, 1996

[54] SECONDARY CELL PROTECTION UNIT FOR PROTECTING A SECONDARY CELL FROM OVERDISCHARGE OR OVERCHARGE WITHOUT EXCESSIVE POWER CONSUMPTION

[75] Inventors: Yasuhisa Higashijima; Masaru Takeuchi, both of Atsugi, Japan

[73] Assignee: Mitsumi Electric Co., Ltd., Tokyo, Japan

[21] Appl. No.: 507,649

[22] Filed: Jul. 25, 1995

[30] Foreign Application Priority Data

Jul. 26, 1994 [JP] Japan ..................... 6-174070

[51] Int. Cl.[6] ................................... H02H 3/18
[52] U.S. Cl. ............................ 361/86; 361/15
[58] Field of Search ................... 361/15, 18, 86, 361/87, 78, 58; 320/45, 33, 40

[56] References Cited

U.S. PATENT DOCUMENTS 3,740,637  6/1973  Iwaki et al. .................... 361/18
3,889,172  6/1975  Lelaider et al. ................ 361/78

Primary Examiner—Todd E. DeBoer
Attorney, Agent, or Firm—Frishauf, Holtz, Goodman, Langer & Chick

[57] ABSTRACT

A secondary battery protection unit comprises a discharge switch (41) and a charge switch (42) inserted in an electric path between a positive terminal (B1) and a negative terminal (B2) together with secondary cells (1 and 2) connected in cascade to the discharge and the charge switches (41 and 42), overcharge detection circuits (45 and 46), and an activation control circuit (17) including a current mirror circuit. The activation control circuit (17) detects a voltage difference between both ends of a combination or one of the discharge and the charge switches (41 and 42) to judge whether or not the secondary cells perform a charging operation or a discharging operation. Only during the charging operation, the activation control circuit (17) makes the current mirror circuit supply a bias voltage to the overcharge detection circuits (45 and 46) to allow activation thereof. During the discharging operation, supply of the bias voltage is inhibited to save excessive power consumption.

10 Claims, 8 Drawing Sheets

SECONDARY CELL PROTECTION UNIT FOR PROTECTING A SECONDARY CELL FROM OVERDISCHARGE OR OVERCHARGE WITHOUT EXCESSIVE POWER CONSUMPTION

Background of the Invention

This invention relates to a secondary cell protection unit for use with a secondary cell (storage cell) such as a lithium ion cell to interrupt an electric path between terminals connected to both ends of the secondary cell when an overdischarged condition or an overcharged condition is detected during a discharging operation or a charging operation of the secondary cell.

Generally, secondary cells contained in a battery pack of a portable electronic apparatus can be repeatedly used by a charging operation to compensate an electric power consumed by a discharging operation. However, the secondary cells of the type are disadvantageous in that a storage capacity is readily deteriorated due to overdischarge and overcharge. In order to protect the secondary cells from the over-discharge and the overcharge, the battery pack is provided with a secondary cell protection unit for inhibiting a charging operation from an external power supply or a discharging operation to an external load upon detection of an overcharged condition or an overdischarged condition of the secondary cell.

The secondary cell protection unit is mounted in the battery pack comprising the secondary cells. The battery pack has a positive terminal and a negative terminal to be electrically connected to the external power supply and the external load during the charging operation and the discharging operation, respectively, for supply of the electric power from the external power supply and to the external load. Upon detection of the overcharged condition during the charging operation or the over-discharged condition during the discharging operation, the secondary cell protection unit drives a circuit breaker element interposed between the positive terminal and the negative terminal to prevent a further progress of the overcharged or the over-discharged condition.

However, since the secondary cell protection unit consumes an electric power capacity of the secondary cells, an electric current flowing during the discharging operation must be extremely small. However, during the discharging operation of the secondary cells, an overcharge detection circuit is activated also. This results in excessive power consumption.

Summary of the Invention

It is a technical object of this invention to provide a secondary cell protection unit which is capable of protecting a secondary cell from overdischarge or overcharge by the use of minimum power consumption without excessive power consumption.

According to this invention, there is provided a secondary cell protection unit at least comprising a positive terminal and a negative terminal through which a d.c. power is supplied to and from an external load and an external power supply, a circuit breaker element inserted in an electric path between the positive and the negative terminals together with a secondary cell connected in cascade to the circuit breaker element, and an overcharge detection circuit for detecting an electric power capacity of the secondary cell to Judge presence or absence of an overcharged condition and for driving the circuit breaker element upon detection of presence of the overcharged condition to interrupt the electric path, the secondary cell protection unit further comprising an activation control circuit for detecting a potential difference between both ends of the circuit breaker element to Judge whether the secondary cell performs a charging operation or a discharging operation and for allowing activation of the overcharge detection circuit only during the charging operation.

According to this invention, there is also provided a secondary cell protection unit at least comprising a positive terminal and a negative terminal through which a d.c. power is supplied to and from an external load and an external power supply, a circuit breaker element inserted in an electric path between the positive and the negative terminals together with a secondary cell connected in cascade to the circuit breaker element, and an overcharge detection circuit for detecting an electric power capacity of the secondary cell to judge presence or absence of an overcharged condition and for driving the circuit breaker element upon detection of presence of the overcharged condition to interrupt the electric path, the secondary cell protection unit further comprising an activation control circuit for detecting a power variation direction between both ends of the circuit breaker element to judge whether the secondary cell performs a charging operation or a discharging operation and for allowing activation of the overcharge detection circuit only during the charging operation.

According to this invention, there is also provided a secondary cell protection unit at least comprising a positive terminal and a negative terminal through which a d.c. power is supplied to and from an external load and an external power supply, a circuit breaker element inserted in an electric path between the positive and the negative terminals together with a secondary cell connected in cascade to the circuit breaker element, and an overcharge detection circuit for detecting an electric power capacity of the secondary cell to judge presence or absence of an overcharged condition and for driving the circuit breaker element upon detection of presence of the overcharged condition to interrupt the electric path, wherein the circuit breaker element comprises a first switch having one end connected to the secondary cell and a second switch connected to the first switch in cascade and to the negative terminal, the secondary cell protection circuit further comprising an activation control circuit for detecting a potential difference between both ends of the first switch to Judge whether the secondary cell performs a charging operation or a discharging operation and for allowing activation of the overcharge detection circuit only during the charging operation.

According to this invention, there is also provided a secondary cell protection unit at least comprising a positive terminal and a negative terminal through which a d.c. power is supplied to and from an external load and an external power supply, a circuit breaker element inserted in an electric path between the positive and the negative terminals together with a secondary cell connected in cascade to the circuit breaker element, and an overcharge detection circuit for detecting an electric power capacity of the secondary cell to Judge presence or absence of an overcharged condition and for driving the circuit breaker element upon detection of presence of the overcharged condition to interrupt the electric path, wherein the circuit breaker element comprises a first switch having one end connected to the secondary cell and a second switch connected to the first switch in cascade and to the negative terminal, the secondary cell protection circuit further comprising an activation control circuit for detecting a power variation direction between both ends of the first switch to Judge whether the secondary cell performs a charging operation or a discharging operation and for allowing activation of the overcharge detection circuit only during the charging operation.

According to this invention, there is also provided a secondary cell protection unit at least comprising a positive terminal and a negative terminal through which a d.c. power is supplied to and from an external load and an external power supply, a circuit breaker element inserted in an electric path between the positive and the negative terminals together with a secondary cell connected in cascade to the circuit breaker element, and an overcharge detection circuit for detecting an electric power capacity of the secondary cell to Judge presence or absence of an overcharged condition and for driving the circuit breaker element upon detection of presence of the overcharged condition to interrupt the electric path, wherein the circuit breaker element comprises a first switch having one end connected to the secondary cell and a second switch connected to the first switch in cascade and to the negative terminal, the secondary cell protection circuit further comprising an activation control circuit for detecting a potential difference between both ends of the second switch to judge whether the secondary cell performs a charging operation or a discharging operation and for allowing activation of the overcharge detection circuit only during the charging operation.

According to this invention, there is also provided a secondary cell protection unit at least comprising a positive terminal and a negative terminal through which a d.c. power is supplied to and from an external load and an external power supply, a circuit breaker element inserted in an electric path between the positive and the negative terminals together with a secondary cell connected in cascade to the circuit breaker element, and an overcharge detection circuit for detecting an electric power capacity of the secondary cell to Judge presence or absence of an overcharged condition and for driving the circuit breaker element upon detection of presence of the overcharged condition to interrupt the electric path, wherein the circuit breaker element comprises a first switch having one end connected to the secondary cell and a second switch connected to the first switch in cascade and to the negative terminal, the secondary cell protection circuit further comprising an activation control circuit for detecting a power variation direction between both ends of the second switch to judge whether the secondary cell performs a charging operation or a discharging operation and for allowing activation of the overcharge detection circuit only during the charging operation.

DESCRIPTION OF THE PREFERRED EMBODIMENTS

Prior to description of specific embodiments of this invention, description will at first be made about a fundamental structure and a function of a conventional secondary cell protection unit.

Figure 1:
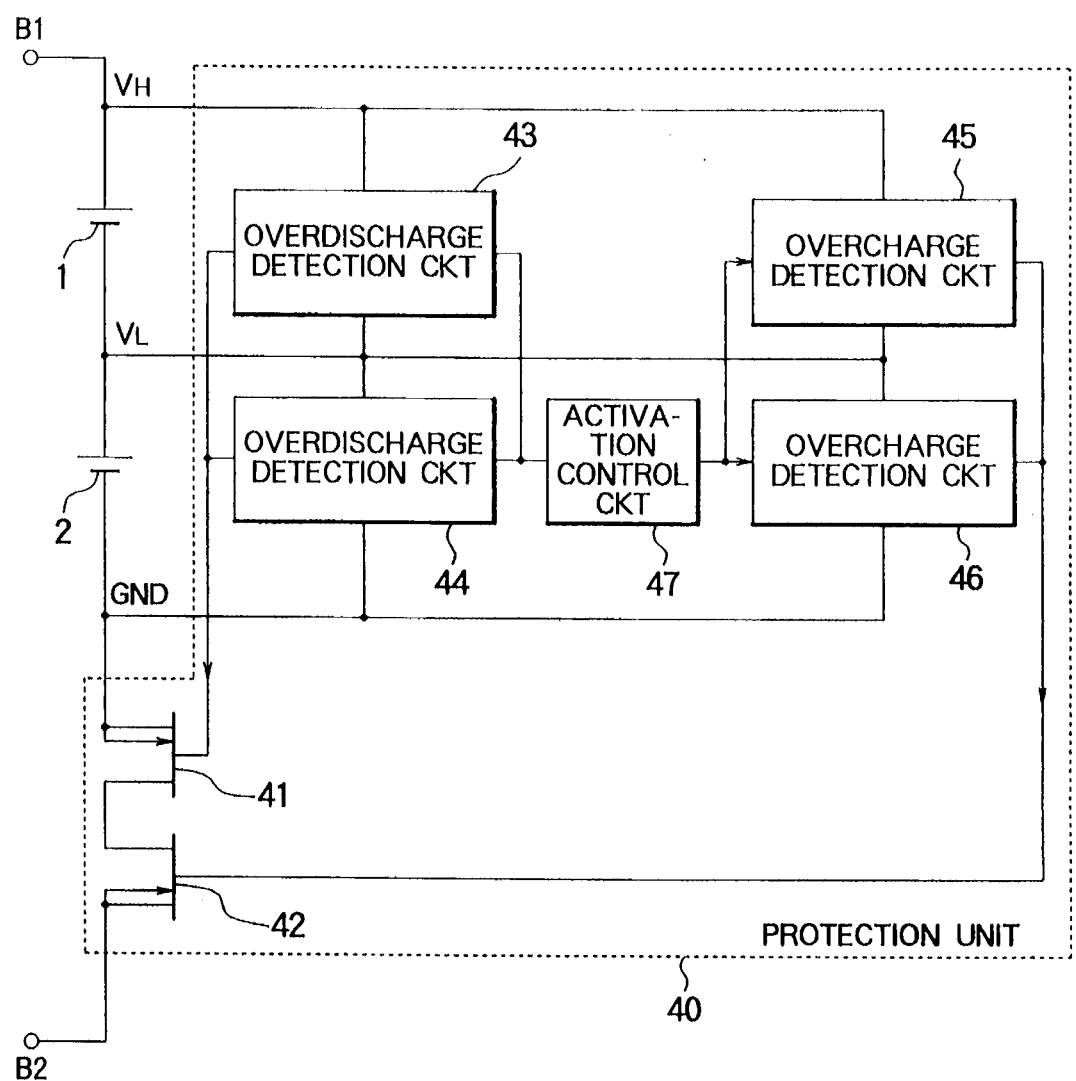
FIG. 1 shows a structure of a battery pack comprising a conventional secondary cell protection unit.

Referring to FIG. 1, the secondary cell protection unit 40 is mounted in a battery pack comprising secondary cells 1 and 2. For supply of electric power to an external load and from an external power supply, the battery pack has a positive terminal B1 and a negative terminal B2 to be connected to the external power supply during a charging operation and to the external load during a discharging operation.

The protection unit 40 comprises a discharge switch 41, a charge switch 42, a first overdischarge detection circuit 43, a second overdischarge detection circuit 44, a first overcharge detection circuit 45, a second overcharge detection circuit 46, and an activation control circuit 47 responsive to a predetermined electric power from each of the second overdischarge detection circuits 43 and 44 for supplying a bias voltage to each of the first and the second overcharge detection circuits 45 and 46.

Herein, the first overdischarge detection circuit 43 and the first overcharge detection circuit 45 detect an overdischarged condition and an overcharged condition of the secondary cell 1, respectively. On the other hand, the second overdischarge detection circuit 44 and the second overcharge detection circuit 46 detect an overdischarged condition and an overcharged condition of the secondary cell 2, respectively. It is noted here that a potential or voltage $V_H$ between the positive terminal B1 and the secondary cell 1 is higher than a potential or voltage $V_L$ between the secondary cells 1 and 2.

Each of the discharge switch 41 and the charge switch 42 is implemented by, for example, an FET (a field effect transistor as a circuit breaker element) responsive to a predetermined d.c. voltage applied to a gate terminal for switching electrical connection/interruption between a source terminal and a drain terminal. When any one of the above-mentioned detection circuits detects the overdischarged condition or the overcharged condition, a corresponding one of the discharge switch 41 and the charge switch 42 is turned off to inhibit an electric current from flowing through an electric path between the terminals B1 and B2.

The above-mentioned secondary cell protection unit 40 consumes electric power capacities of the secondary cells 1 and 2. In this connection, the electric current flowing during the discharging operation must be suppressed to an extremely small level. However, the overcharge detection circuits 45 and 46 are activated also during the discharging operation of the secondary cells 1 and 2. This results in excessive power consumption.

In this invention, attention is focused on the facts that a potential and a power variation direction between both ends of a circuit breaker element comprising the discharge switch 41 and the charge switch 42 are changed between the discharging operation or an unused condition and the charging operation and that detection of the overcharged condition is required only during the discharging operation. At first, detection of the potential or the power variation direction between the both ends of the discharge switch 41 and the charge switch 42 to judge whether the discharging operation or the charging operation is being performed. The overcharge detection circuits 45 and 46 are activated only during the charging operation. Thus, power consumption is reduced during the discharging operation or in the unused condition. In other words, if the overcharge detection circuits 45 and 46 are not activated during the discharging operation, power consumption in that period is saved.

Now, description will proceed to a fundamental structure and a function of each of secondary cell protection units according to a few embodiments of this invention. Each of the secondary cell protection units according to the embodiments of this invention has similar components similar to those of the conventional unit 40 described in conjunction with FIG. 1. Accordingly, similar parts are designated by like reference numerals and will not be described any longer.

First Embodiment

Figure 2:
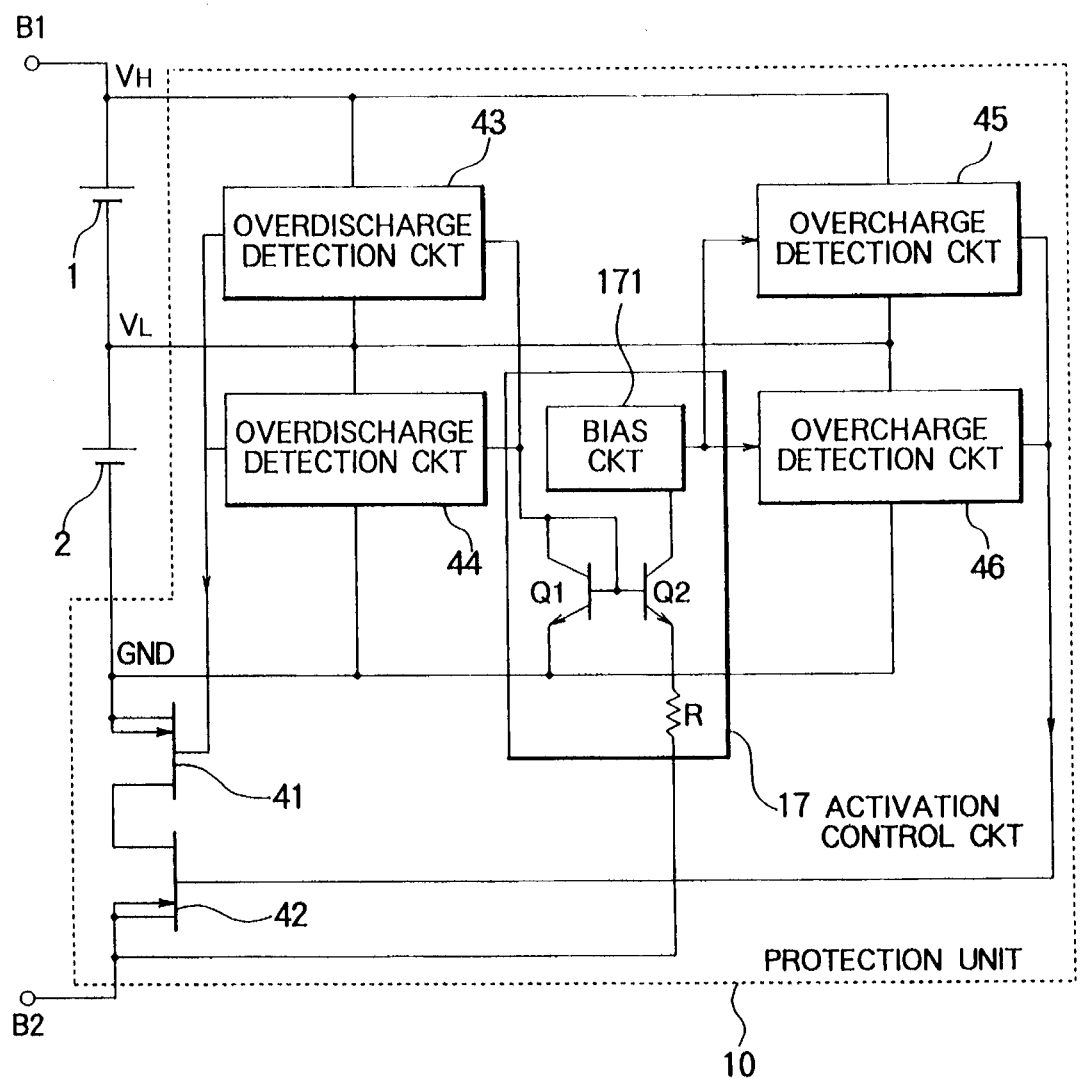
FIG. 2 shows a structure of a battery pack comprising a secondary cell protection unit according to a first embodiment of this invention.

FIG. 2 shows a structure of a battery pack comprising a secondary cell protection unit 10 according to a first embodiment of this invention.

The secondary cell protection unit 10 has a structure resorting to a voltage drop resulting from a resistance component formed by the discharge switch 41 and the charge switch 42. The secondary cell protection unit 10 comprises an activation control circuit 17 interposed between the overdischarge detection circuits 43 and 44 and the overcharge detection circuits 45 and 46. The activation control circuit 17 is supplied with a detected potential between both ends of a switch array comprising the discharge switch 41 and the charge switch 42.

The activation control circuit 17 comprises a current mirror circuit formed by a first transistor Q1, a second transistor Q2, and a detection resistor R, and a bias circuit 171 for producing a bias current to allow activation of each of the overcharge detection circuits 45 and 46. The first transistor Q1 has an emitter terminal connected to a reference potential line (a GND line) and to one end of the switch array at the side of the discharge switch 41. The second transistor Q2 has an emitter terminal connected through the detection resistor R to the negative terminal B2 and to the other end of the switch array at the side of the charge switch 42, and a base terminal connected to base and collector terminals of the first transistor Q1.

The collector terminal of the first transistor Q1 is supplied with output powers of the overdischarge detection circuits 43 and 44 as illustrated in the figure. The first transistor Q1 has an emitter size much greater than that of the second transistor Q2. The detection resistor R has a resistance selected so that an electric current flowing through the second transistor Q2 in the unused condition or during the discharging operation becomes substantially equal to zero.

Figure 3:
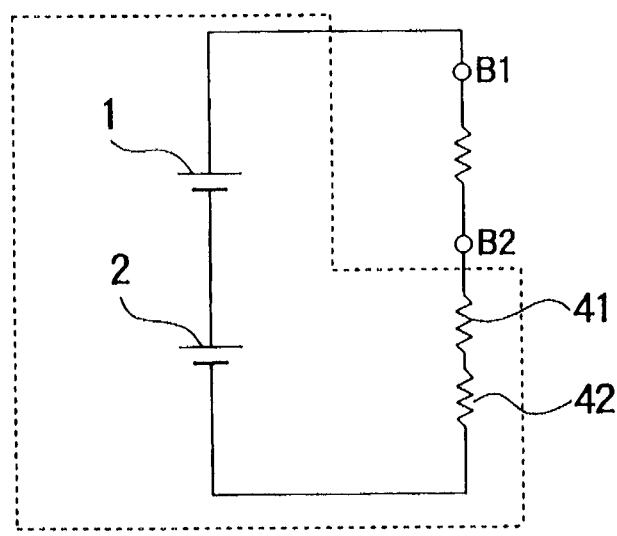
FIG. 3 shows a main portion of the secondary cell protection unit illustrated in FIG. 2 for describing a principle of an operation of the secondary cell protection unit during a discharging operation.
Figure 4:
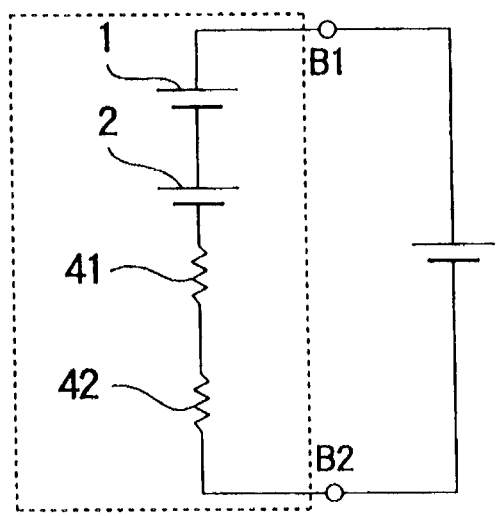
FIG. 4 shows a main portion of the secondary cell protection unit illustrated in FIG. 2 for describing a principle of an operation of the secondary cell protection unit during a charging operation.

Let the discharge switch 41 and the charge switch 42 be equivalently represented by resistors. In this event, the battery pack comprising the secondary cell protection unit 10 has a structure illustrated in FIG. 3 in the unused condition or during the discharging operation. During the charging operation, the battery pack has a structure illustrated in FIG. 4. Specifically, in the structure illustrated in FIG. 3, the discharge switch 41 and the charge switch 42 act as internal load members. On the other hand, in the structure illustrated in FIG. 4, the discharge switch 41 and the charge switch 42 act as internal resistor members for the secondary cells 1 and 2. Attention will herein be directed to potentials at the GND line and at the negative terminal B2. During the discharging operation, the potential at the negative terminal B2 is higher than that of the GND line. During the charging operation, the relationship is reversed.

Let this relationship be applied to the secondary battery protection unit 10 illustrated in FIG. 2. In the unused condition or during the discharging operation, the potential at the negative terminal B2 is relatively high. However, because of presence of the discharge switch 41 and the charge switch 42 in the electric path between the positive terminal B1 and the negative terminal B2, a voltage drop is caused to occur so that the potentials at the negative terminals B2 and at the GND line become substantially equal to each other. At this time, the electric current flowing through the second transistor Q2 becomes weak. The electric current is absorbed by the detection resistor R described above and does not reach a level sufficient to turn on the bias circuit 171. As a consequence, no bias power is produced so that the overcharge detection circuits 44 and 45 are not activated.

During the charging operation, the potential at the negative terminal B2 is relatively low so that the electric current flowing through the second transistor Q2 is increased irrespective of presence of the detection resistor R. As a consequence, the bias circuit 171 is turned on to activate the overcharge detection circuits 45 and 46.

As described, in the secondary cell protection circuit 10 according to the first embodiment, the voltage drop by the discharge switch 41 and the charge switch 42 is effectively utilized. With such a simple structure, detection is made of variation of the potential between the both ends of the switch array, namely, between the GND line and the negative terminal B2 to judge whether the charging operation or the discharging operation is being carried out. The overcharge detection circuits 45 and 46 are activated only during the charging operation. During the discharging operation, the overcharge detection circuits 45 and 46 are not activated. It is thus possible to avoid excessive power consumption which the conventional unit 40 suffers.

The current mirror circuit can be implemented by the transistors of the same type and is therefore easily integrated to present various advantages in size and cost. It is noted here that the current mirror circuit is not restricted to the NPN type transistors Q1 and Q2 illustrated in the figure but may be implemented by semiconductor elements of any other appropriate type.

The secondary cell protection unit 10 according to the first embodiment is based on the fact that the sufficient voltage drop is assured by the resistance component formed by the discharge switch 41 and the charge switch 42. In case where the difference between the potentials of the GND line and the negative terminal B2 is approximately equal to a cell voltage and the charging operation is performed by a small current, the overcharge detection circuits 45 and 46 may continue an inactive condition even in the charging operation.

In view of the above, proposal is made of another secondary cell protection unit which does not utilize the voltage drop resulting from the resistance component formed by the discharge switch 41 and the charge switch 42.

Second Embodiment

Figure 5:
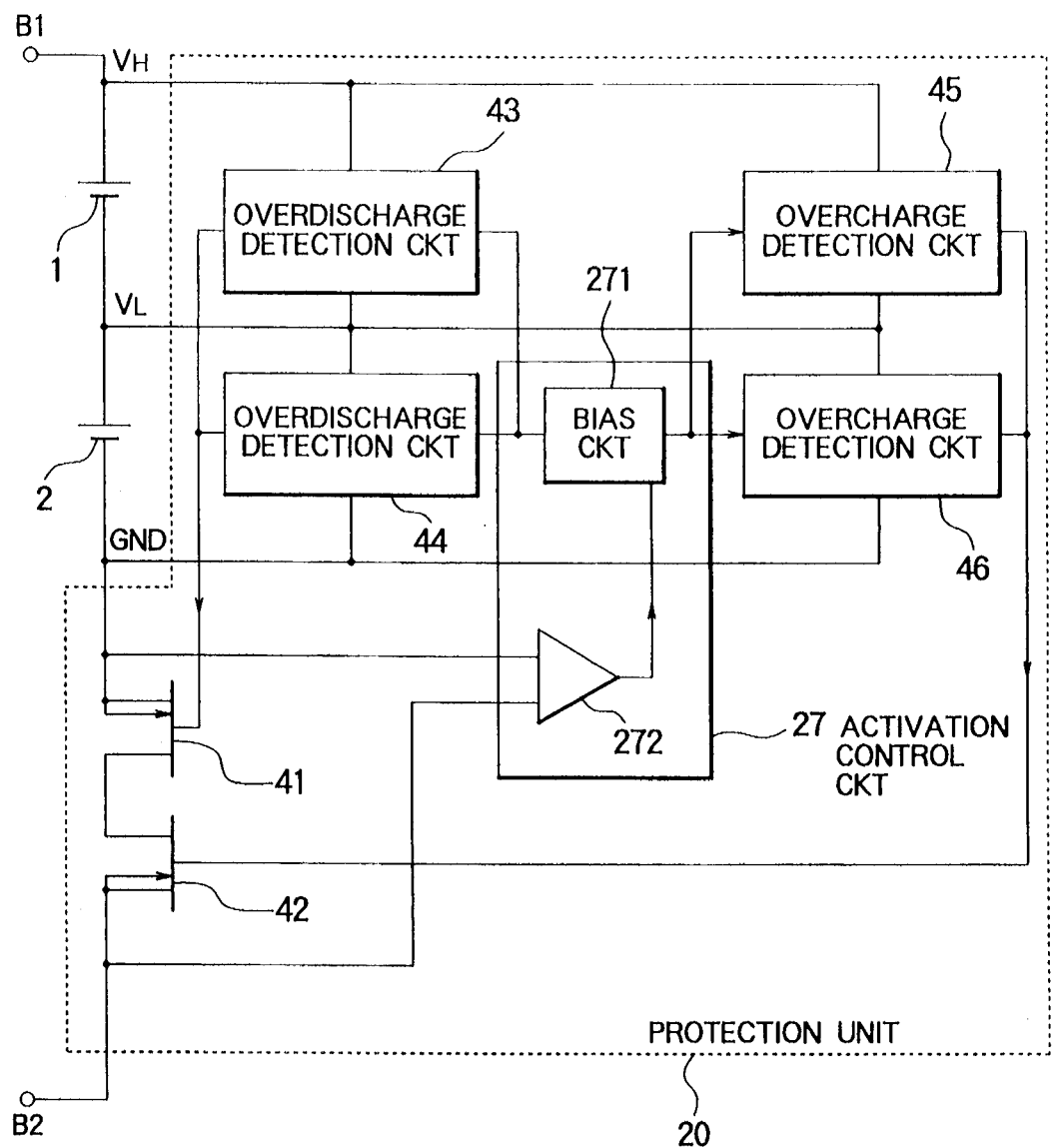
FIG. 5 shows a structure of a battery pack comprising a secondary cell protection unit according to a second embodiment of this invention.

FIG. 5 shows a structure of a battery pack comprising a secondary cell protection unit according to a second embodiment of this invention.

The secondary cell protection unit 20 does not require consideration of the voltage drop resulting from the resistance component formed by the discharge switch 41 and the charge switch 42. Instead of the activation control circuit 17 comprising the current mirror circuit in the secondary cell protection unit 10 according to the first embodiment, the secondary cell protection unit 20 comprises an activation control circuit 27 formed by a bias circuit 271 and a comparator 272 for comparing voltages between the both ends of the switch array comprising the discharge switch 41 and the charge switch 42. The bias circuit 271 in the activation control circuit 27 is similar to the bias circuit 171 used in the first embodiment. The comparator 272 may be of an universal type but is preferably of a low offset voltage type.

The activation control circuit 27 detects whether the discharging operation or the charging operation is being performed by the secondary cells 1 and 2 in the manner basically similar to that of the first embodiment. However, in the secondary battery protection unit 20 according to the second embodiment, it is unnecessary to consider the resistance component formed by the discharge switch 41 and the charge switch 42. Even during the charging operation by the small current, it is possible to Judge that the charging operation is being performed.

Summarizing, the secondary cell protection unit 10 according to the first embodiment of this invention is applicable to the case where the sufficient voltage drop is assured by the resistance component formed by the circuit breaker element. In this case, by the use of the current mirror circuit for detecting the difference between the reference potential (GND potential) and the potential at the negative terminal B2, the activation control circuit 17 supply the bias power to the overcharge detection circuits 45 and 46 only when the potential difference exceeds a predetermined level. On the other hand, the secondary cell protection unit 20 according to the second embodiment of this invention is applicable to the case where the sufficient voltage drop is not assured by the resistance component formed by the circuit breaker element. In this case, by the use of the comparator 272 for comparing voltage levels at the both ends of the circuit breaker element, the activation control circuit 27 supplies the bias power to the overcharge detection circuits 45 and 46 only when the difference exceeds a predetermined level.

In the above-mentioned first and the second embodiments, description has been directed to the structure in which the discharge switch 41 and the charge switch 42 as the circuit breaker element are connected in cascade and the both ends of the switch array comprising these switches are connected to the activation control circuit 17 or 27. However, the similar function is achieved with a modified structure in which both ends of one of the switches are connected to the activation control circuit 17 or 27. Such a modified structure is contained in the scope of this invention.

Figure 6:
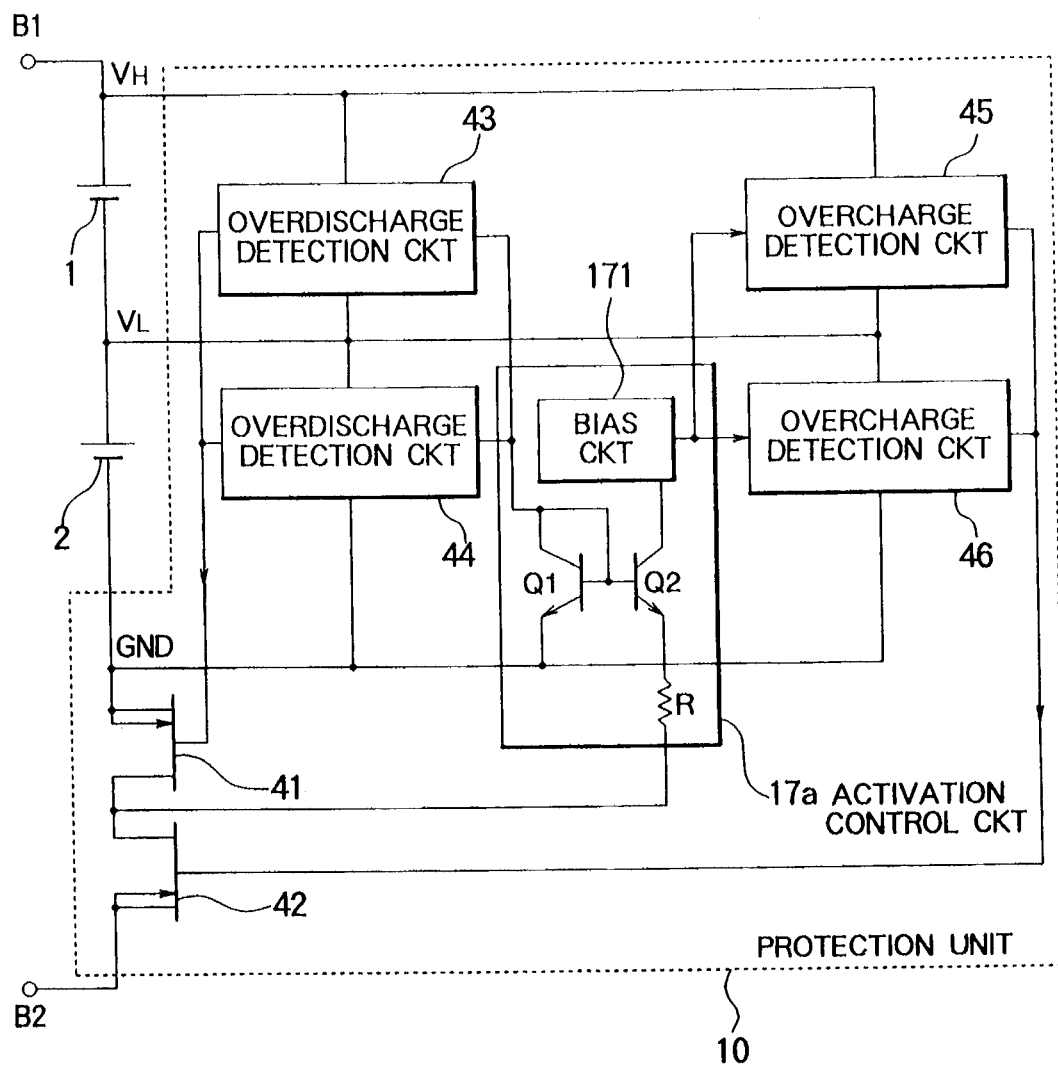
FIG. 6 shows a structure of a battery pack comprising a modification of the secondary cell protection unit illustrated in FIG. 2.
Figure 7:
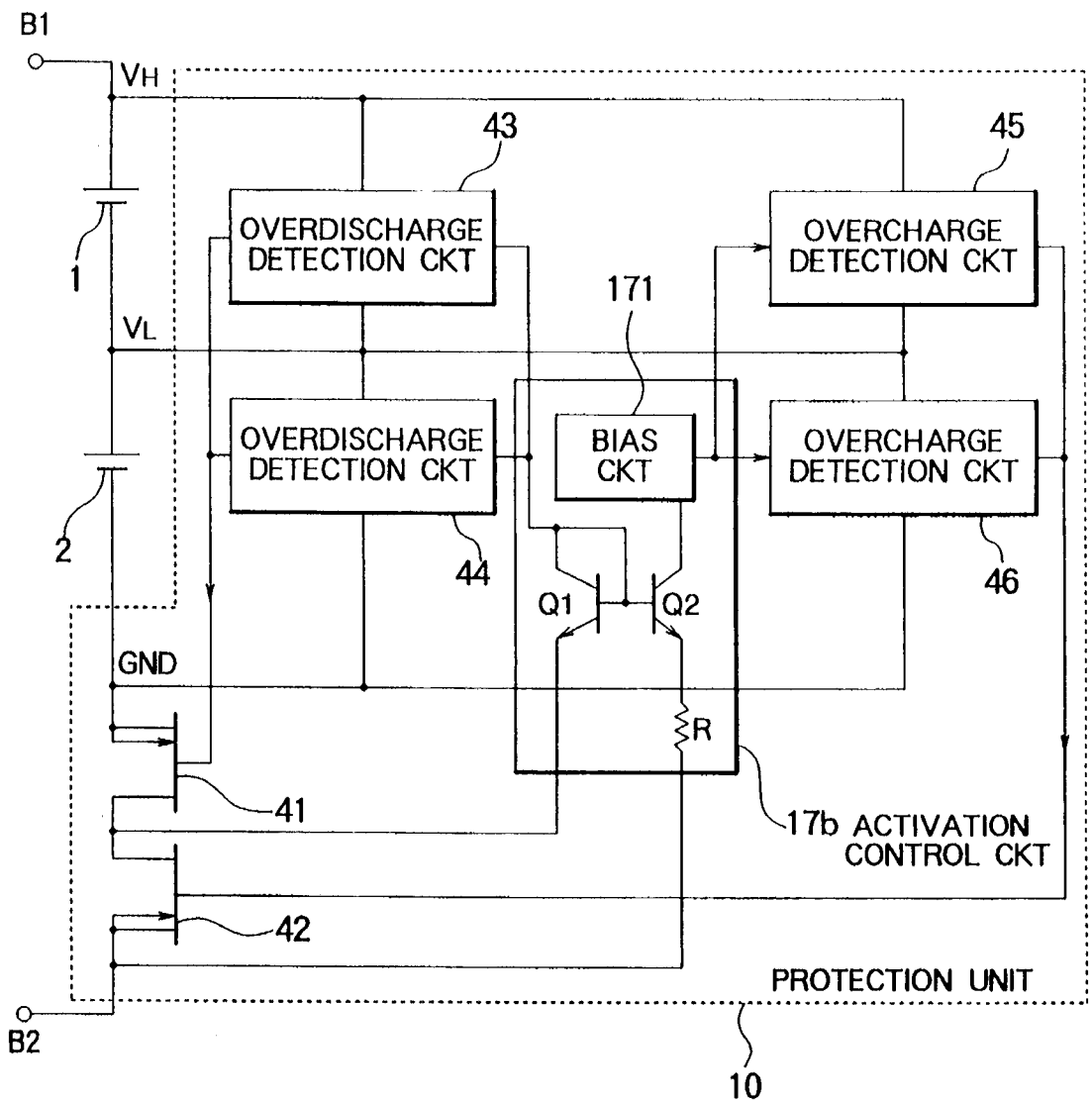
FIG. 7 shows a structure of a battery pack comprising another modification of the secondary cell protection unit illustrated in FIG. 2.
Figure 8:
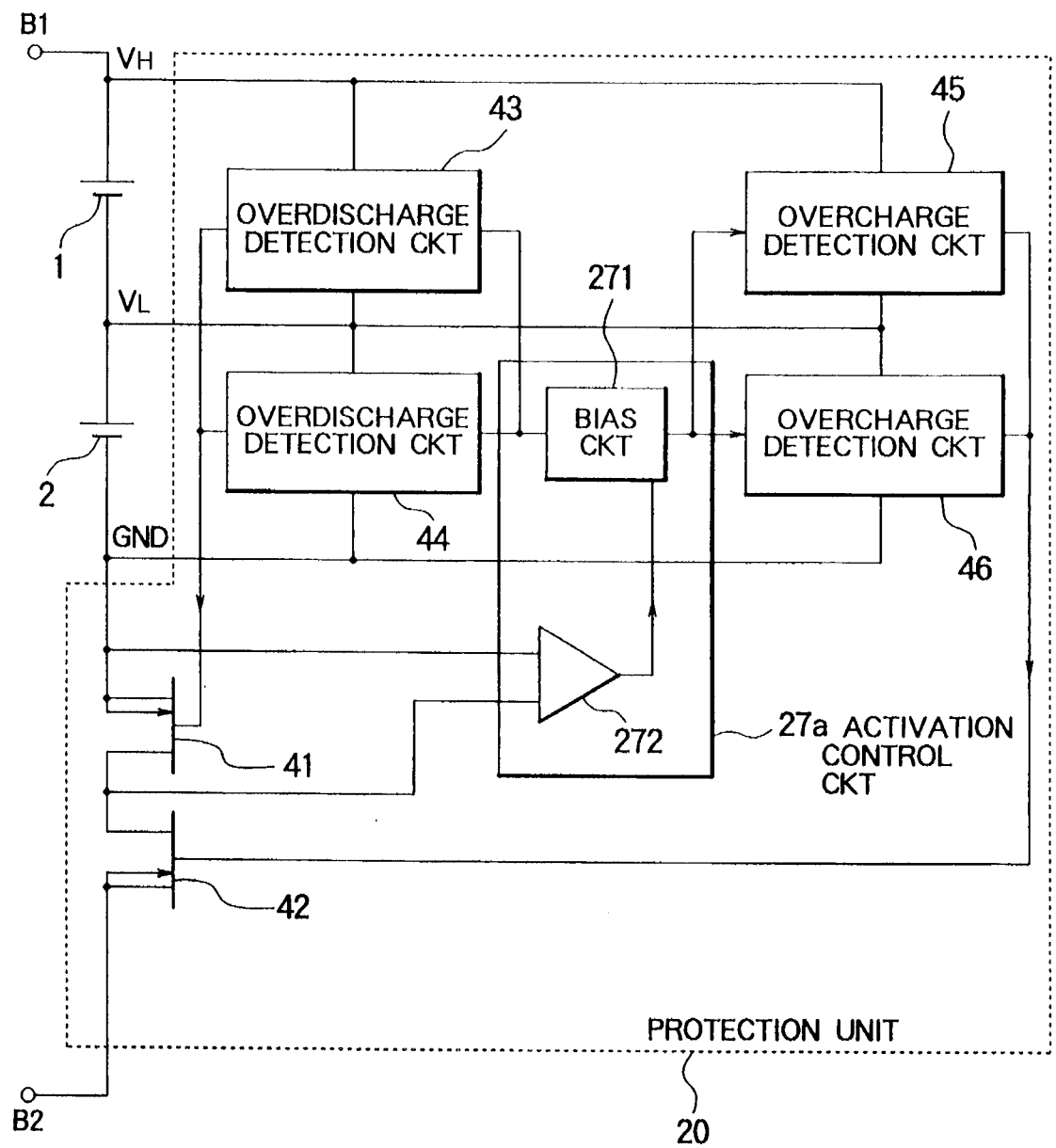
FIG. 8 shows a structure of a battery pack comprising a modification of the secondary cell protection unit illustrated in FIG. 5.
Figure 9:
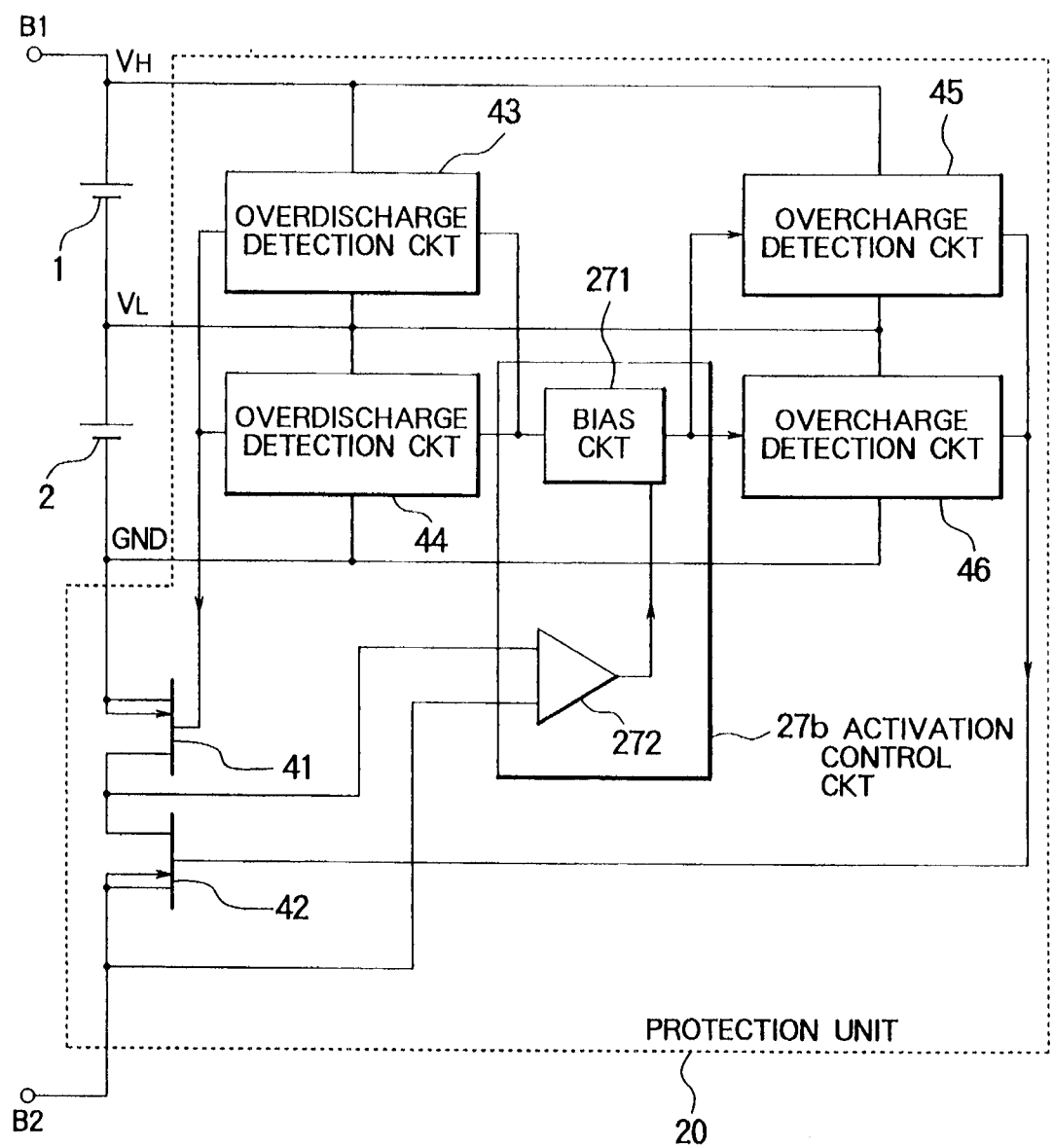
FIG. 9 shows a structure of a battery pack comprising another modification of the secondary cell protection unit illustrated in FIG. 5.

Specifically, the protection unit 10 of the first embodiment can be modified in the following manner. Referring to FIG. 6, an activation control circuit 17a is connected to the both ends of the discharge switch 41 (first switch). Alternatively, as illustrated in FIG. 7, an activation control circuit 17b is connected to the both ends of the charge switch 42 (second switch). Likewise, the protection unit 20 of the second embodiment can be modified as follows. Referring to FIG. 8, an activation control circuit 27a is connected to the both ends of the discharge switch 41 (first switch). Alternatively, as illustrated in FIG. 9, an activation control circuit 27b is connected to the both ends of the charge switch 42 (second switch).

As described in conjunction with the secondary cell protection units 10 and 20 according to the first and the second embodiments, it is a technical gist of this invention to detect whether or not the charging operation is being performed, focusing the fact that the potential of the negative terminal B2 is varied between the discharging operation and the charging operation. In the foregoing description, the activation control circuits 17, 17a, 17b, 27, 27a, and 27b of the above-mentioned various structures carry out judgement between the charging operation and the discharging operation by detecting the potential difference. With an alternate structure in which the power variation direction during a predetermined period is detected instead of detection of the potential difference, the similar function is achieved. Such an alternate structure is included in the scope of this invention.

As is obvious from the foregoing description, the secondary cell protection unit according to this invention comprises the activation control circuit for detecting the potential difference or the power variation direction at the both ends of the circuit breaker element to judge whether the secondary cells perform the charging operation or the discharging operation and for allowing activation of the overcharge detection circuits only during the charging operation. Thus, activation of the overcharge detection circuits is inhibited during the discharging operation so that excessive power consumption is saved. Particularly, as a structure adapted to the case where the sufficient voltage drop is assured by the resistance component formed by the circuit breaker element, the activation control circuit according to the first embodiment comprises the current mirror circuit implemented by a pair of the semiconductor elements and the detection resistor. Only when the potential difference between one end and the other end of the circuit breaker element exceeds the predetermined level, the overcharge detection circuits are supplied with the bias power from the output side of the current mirror circuit. Thus, the structure is simple. On the other hand, as another structure adapted to the case where the sufficient voltage drop is not assured by the resistance component formed by the circuit breaker element, the activation control circuit according to the second embodiment comprises the comparator for comparing the voltage levels of one end and the other end of the circuit breaker element. Only when the difference between the voltage levels exceeds the predetermined level, the overcharge detection circuits are supplied with the bias power from the comparator. With this structure, it is possible to avoid the overcharge detection circuits from being kept inactive when the potential is substantially equal to that of the secondary cell and the charging operation is carried out by the small current. Thus, the unit is remarkably improved in reliability.

What is claimed is:

1. A secondary cell protection unit at least comprising a positive terminal and a negative terminal through which a d.c. power is supplied to and from an external load and an external power supply, a circuit breaker element inserted in an electric path between said positive and said negative terminals together with a secondary cell connected in cascade to said circuit breaker element, and an overcharge detection circuit for detecting an electric power capacity of said secondary cell to judge presence or absence of an overcharged condition and for driving said circuit breaker element upon detection of presence of said overcharged condition to interrupt said electric path, said secondary cell protection unit further comprising an activation control circuit for detecting a potential difference between both ends of said circuit breaker element to Judge whether said secondary cell performs a charging operation or a discharging operation and for allowing activation of said overcharge detection circuit only during the charging operation.

2. A secondary cell protection unit as claimed in claim 1, wherein said activation control circuit comprises a current mirror circuit formed by a first semiconductor element having an input terminal connected to a reference potential line and to one end of said circuit breaker element and a second semiconductor element having an input terminal connected through a detection resistor to said negative terminal and to the other end of said circuit breaker element and a gate terminal connected to gate and output terminals of the first semiconductor element, said overcharge detection circuits being supplied with a bias power from an output terminal of said second semiconductor element only when a potential difference between the one end and the other end of the circuit breaker element exceeds a predetermined level.

3. A secondary cell protection unit as claimed in claim 1, wherein said activation control circuit comprises a comparator for comparing a voltage level at one end of said circuit breaker element that is connected to a reference potential line and a voltage level at the other end of the circuit breaker element that is connected to the negative terminal, the overcharge detection circuits being supplied with a bias power only when the difference between the one end and the other end of the circuit breaker element exceeds a predetermined level.

4. A secondary cell protection unit as claimed in claim 1, wherein said circuit breaker element comprises two switches connected in cascade to each other, the both ends of a switch array comprising the two switches being connected to the activation control circuit.

5. A secondary cell protection unit at least comprising a positive terminal and a negative terminal through which a d.c. power is supplied to and from an external load and an external power supply, a circuit breaker element inserted in an electric path between said positive and said negative terminals together with a secondary cell connected in cascade to said circuit breaker element, and an overcharge detection circuit for detecting an electric power capacity of said secondary cell to Judge presence or absence of an overcharged condition and for driving said circuit breaker element upon detection of presence of said overcharged condition to interrupt said electric path, said secondary cell protection unit further comprising an activation control circuit for detecting a power variation direction between both ends of said circuit breaker element to judge whether said secondary cell performs a charging operation or a discharging operation and for allowing activation of said overcharge detection circuit only during the charging operation.

6. A secondary cell protection unit at least comprising a positive terminal and a negative terminal through which a d.c. power is supplied to and from an external load and an external power supply, a circuit breaker element inserted in an electric path between said positive and said negative terminals together with a secondary cell connected in cascade to said circuit breaker element, and an overcharge detection circuit for detecting an electric power capacity of said secondary cell to Judge presence or absence of an overcharged condition and for driving said circuit breaker element upon detection of presence of the overcharged condition to interrupt said electric path, wherein said circuit breaker element comprises a first switch having one end connected to said secondary cell and a second switch connected to said first switch in cascade and to said negative terminal, said secondary cell protection circuit further comprising an activation control circuit for detecting a potential difference between both ends of said first switch to judge whether said secondary cell performs a charging operation or a discharging operation and for allowing activation of said overcharge detection circuit only during the charging operation.

7. A secondary cell protection unit at least comprising a positive terminal and a negative terminal through which a d.c. power is supplied to and from an external load and an external power supply, a circuit breaker element inserted in an electric path between said positive and said negative terminals together with a secondary cell connected in cascade to said circuit breaker element, and an overcharge detection circuit for detecting an electric power capacity of said secondary cell to judge presence or absence of an overcharged condition and for driving said circuit breaker element upon detection of presence of the overcharged condition to interrupt said electric path, wherein said circuit breaker element comprises a first switch having one end connected to said secondary cell and a second switch connected to said first switch in cascade and to said negative terminal, said secondary cell protection circuit further comprising an activation control circuit for detecting a potential difference between both ends of said second switch to Judge whether said secondary cell performs a charging operation or a discharging operation and for allowing activation of said overcharge detection circuit only during the charging operation.

8. A secondary cell protection unit at least comprising a positive terminal and a negative terminal through which a d.c. power is supplied to and from an external load and an external power supply, a circuit breaker element inserted in an electric path between said positive and said negative terminals together with a secondary cell connected in cascade to said circuit breaker element, and an overcharge detection circuit for detecting an electric power capacity of said secondary cell to judge presence or absence of an overcharged condition and for driving said circuit breaker element upon detection of presence of the overcharged condition to interrupt said electric path, wherein said circuit breaker element comprises a first switch having one end connected to said secondary cell and a second switch connected to said first switch in cascade and to said negative terminal, said secondary cell protection circuit further comprising an activation control circuit for detecting a power variation direction between both ends of said first switch to Judge whether said secondary cell performs a charging operation or a discharging operation and for allowing activation of said overcharge detection circuit only during the charging operation.

9. A secondary cell protection unit at least comprising a positive terminal and a negative terminal through which a d.c. power is supplied to and from an external load and an external power supply, a circuit breaker element inserted in an electric path between said positive and said negative terminals together with a secondary cell connected in cascade to said circuit breaker element, and an overcharge detection circuit for detecting an electric power capacity of said secondary cell to judge presence or absence of an overcharged condition and for driving said circuit breaker element upon detection of presence of the overcharged condition to interrupt said electric path, wherein said circuit breaker element comprises a first switch having one end connected to said secondary cell and a second switch connected to said first switch in cascade and to said negative terminal, said secondary cell protection circuit further comprising an activation control circuit for detecting a power variation direction between both ends of said second switch to Judge whether said secondary cell performs a charging operation or a discharging operation and for allowing activation of said overcharge detection circuit only during the charging operation.

10. A secondary cell protection unit as claimed in claim 2, wherein said circuit breaker element comprises two switches connected in cascade to each other, the both ends of a switch array comprising the two switches being connected to the activation control circuit.

* * * * *